3,435,112
REPOSITORY VACCINE AND METHOD OF
PREPARING THE SAME
Charles R. Kuhns and William H. Beckenhauer, Lincoln,
Nebr., assignors to Norden Laboratories, Inc., Lincoln,
Nebr., a corporation of Delaware
No Drawing. Filed June 21, 1966, Ser. No. 559,114
Int. Cl. A61k 23/00
U.S. Cl. 424—89         15 Claims This invention relates to vaccines, and particularly to an improved repository vaccine and method of preparing the same.

In the field of immunology, sufficient vaccine to produce satisfactory immunity against a number of diseases cannot be administered in a single injection. Consequently, such vaccines needed to be administered in two or more injections at intervals of a few weeks.

It has long been suggested that adjuvants could be added to vaccine preparations for the purpose of delaying release of antigen into the system and thereby reduce the number of injections required to produce the desired immunity. Gonzalez et al. (Gonzalez, P. and Armangue, M. Compt. rend. soc. biol., 106 (1931), 1006–1008) demonstrated antigen enhancement by absorption on kaolin. Others have used such substances as gum tragacanth, bentonite, carbopols and calcium phosphate gels, tapioca, alum, aluminum hydroxide, calcium chloride, sodium alginate, and many other such substances, but when many adjuvants of this character were deposited into subcutaneous tissue, they were not metabolized but remained as foreign bodies. Consequently, such adjuvants were not desirable.

The use of paraffin to enhance sensitization to tuberculin was reported by Coulaud (Rev. Tuberc 2 (1934) 850–855) and is apparently the first published record of the use of hydrocarbons to enhance antigenic activity. Paraffin oil was used in a similar manner by Saenz (Compt. rend. soc. biol. 120 (1935) 1050–1053). Jules Freund (Ann Rev. Microbio 1 (1947) 291–308) used and reported extensively on paraffin oil to enhance antigenicity and is generally recognized as the authority on oil adjuvants.

Since most antigens are water soluble and/or are hydrophilic to varying degrees in aqueous suspensions, the vaccines have been prepared in the form of emulsions. However, prior to the present invention, emulsifier additives were necessary to make and hold the emulsions. The spectrum of emulsifiers that have been employed include lanolin, mannide monooleate, "Falba," "Tween 80," lecithin, myricin and cholesterol, sorbitans, sodium lauryl sulfate, sulfonates, cholesterin and metacholesterin. The biologic safety of such emulsifying chemical additives incorporated in parenterally administered materials has been questioned. However, the superior adjuvant effect of mineral oils has been very well documented in man and animals over the years. Although mineral oils have proven excellent adjuvants, it is generally acknowledged that they also are not metabolized by a living host, and, therefore, when administered parenterally become a persistent foreign body.

Accordingly, animal or vegetable oils, being metabolizable by a living host, were thought of as a substitute for the mineral oil. The substitution of a vegetable oil, peanut oil, for mineral oil, was attempted by J. Freund (Jr. Imm., 60 (1940) 383–398), but he found it unsatisfactory. Later, A. F. Woodhour et al. (Proc. Soc. Expl. Biol. Med., 116 (1964) 516–530) reported that penaut oil with mannide monooleate as an emulsifier was efficacious, while acknowledging that mineral oil emulsions produced maximal response. Woodhour reported some oils more effective than others: peanut, sesame and chaulmoogra produced good effect, ethyl oleate and lantrol produced intermediate effects, and preparations with poppyseed and safflower were without noticeable effect. Also, Woodhour reported that vegetable oils such as peanut, sesame, chaulmoogra, corn, olive, cottonseed, persic and oil of sweet almond were effective adjuvants with influenza and poliomyelitis antigens in the aqueous phase and with mannide monooleate being used as an emulsifier.

In general, mineral, vegetable and animal adjuvants are not considered useful without an emulsifying or wetting agent to prevent breakdown of the emulsion into separate oil and water phases, with the result that the separated aqueous phase no longer has the retarding action of the oil intended to delay release of antigen.

Attention is again called to the ill effects of emulsifying and wetting agents which have been so necessary to establish and retain the emulsions.

With the above in mind, the principal object of this invention is to provide an improved repository vaccine and method of producing the same which exhibits superior antibody production rates and titer levels, has a sustained release of antigens, and produces prolonged immunity.

A further object of the invention is the incorporation of chemical sterilants to sterilize the oil phase and subsequently preserve the finished emulsion, doing away with the necessity of autoclaving or other sterilizing methods.

Other objects of the present invention are to produce a repository vaccine independent of restrictive concentrations and biologic safety of commercial emulsifiers or surface active agents; to produce a repository vaccine by a novel method which greatly simplifies and reduces the cost of production; to prepare a repository vaccine using an oil heretofore not known to act as a potentiator of antibody protection; and to produce a repository vaccine, without an added emulsifier, which by test has proved superior over previous vaccines consisting of oil adjuvant with separately added emulsifying or wetting agents.

The present invention is centered around the fact that the cell walls and/or bodies of microorganisms comprising the antigens are composed of chemical constituents which have surface active properties. For example, we have found that certain microorganism constituents will effectively emulsify or alter the interfacial surface tension of oils to a sufficient degree to cause eventual emulsification with aqueous systems.

The constituents of the microorganisms may be made more effective by reducing a microorganism wall and/or body to amorphous and discontinuous parts. When so reduced, these amorphous and disconnected parts release constituents which will more effectively cause the emulsification of vegetable, mineral and animal oils in the presence of water.

We have found that the number or amount of microorganisms vary proportionately to the degree of saturation and the chain length and the symmetry of the chain of the various oils subjected to this method of emulsification. That is, the greater degree of saturation, or the lower the iodine number of the oils, the more cell constituents needed to effect an emulsion. Also, the cell constituents to effect an emulsion vary with the number of carbons in the chain and its symmetry (straight or branched).

The specific cell constituent or constituents that causes the emulsifiability of the oils is not known at this time, however, since different organisms tested always yield a water-in-oil type emulsion it suggests that the amino acids, lower peptides, lipoproteins, and hydrolyzed chitin are perhaps the surface active agents or agent in this process.

The microorganisms of different taxonomical classification which have been tested make it reasonable to assume that there are literally thousands of microorganisms ranging in size from virus to the protozoan capable of surface active emulsification. It is also conceivable that microorganisms whose constituent parts are more hydrophilic are capable of causing an emulsion of the oil-in-water type.

We have found that the prepared organism mass may be suspended either in the oil phase or the aqueous phase, since both methods of introduction effect emulsification. Furthermore, the mass of organisms may be introduced in a desiccated dry state into either phase of the emulsion.

Generally the oil to be used, animal, vegetable, or mineral, is weighed into a suitable container within which the temperature can be accurately regulated. The oil becomes a better suspending agent with the addition of a thickener, such as aluminum stearate, which, by increasing the viscosity of the oil, retards the rate of metabolism in the finished product. It is also desirable to add sterilants such as methyl P-hydroxybenzoate, propyl P-hydroxybenzoate, and butyl P-hydroxybenzoate. The thickener and sterilants are dispersed in the oil. The temperature of the mixture is slowly raised to 115–130° C. at the rate of 1° per minute, the ultimate temperature being dictated by the ingredients and concentration of the same. When the desired temperature is reached, the heat and all stirring or agitation is stopped and the hot mixture is allowed to cool to 100° C. slowly. Thereafter it is cooled rapidly to 30–40° C. This gelled oil is hereafter referred to as the base.

A specific formula of a base made in accordance with the invention is as follows:

| | W./w., percent |
|---|---|
| Oil (animal, vegetable, mineral) | 97.6355 |
| Aluminum stearate | 2.0000 |
| Methyl P-hydroxylbenzoate | 0.2700 |
| Propyl P-hydroxylbenzoate | 0.0675 |
| Butyl P-hydroxylbenzoate | 0.0270 |

The antigen or microorganisms to be used are prepared so that cell constituents are reduced to amorphous and discontinuous parts to serve as the emulsifier in the system. The reduction of the cells may be accomplished by exposing the cells to high mechanical sheer forces. Many methods of mechanical grinding, lysing and the like accomplish the same end. No other emulsifying chemical is needed or desired. The amount or weight of organisms to be introduced will vary according to the oil used and the eventual dose size. The organism mass may be either dispersed in the aqueous phase or in the base. The amount of aqueous phase to be added is determined by ideal phase proportion and the final dosage volume desired. The aqueous phase is added and emulsification is brought about by the various techniques and emulsators. The product can then be filled into suitable containers and capped or stoppered with suitable closures. In approximately four days, the product is self-sterilized and ready for use.

The antigen may consist of organisms or viruses, mixed as to genera or strain, with similar results. For example, a virus and two bacteria or different genera or specie may be combined to make a so-called polyvalent vaccine. The different combinations of virus-virus or virus-bacteria are known to be quite numberless. Among the antigens tested are *Clostridium chauvei, Leptospira pomona, Vibrio fetus,* rabies, and *Clostridium chauvei* and *Clostridium septicum* in combination.

Specific examples of vaccines using *Vibrio fetus* bacteria are as follows:

I

| | v./v., percent |
|---|---|
| Base (animal, vegetable, mineral) | 66.6666 |
| *Vibrio fetus* suspension [1] | 33.3334 |

[1] Number of organisms depends on carbon chain length and final dosage volume desired.

II

| | v./v., percent |
|---|---|
| Base safflower (vegetable oil) | 66.6666 |
| *Vibrio fetus* suspension | 33.3334 |

III

| | |
|---|---|
| Base Squalane (animal oil) | 50.00 |
| *Vibrio fetus* suspension [2] | 50.00 |

[2] Because of the 30 carbon, branched chain length of this oil, the number of organisms will be increased 133%. The phase ratio is changed to 1:1.

IV

| | v./v., percent |
|---|---|
| Base "Drakeol 6VR" (mineral oil) | 66.6666 |
| *Vibrio fetus* suspension [3] | 33.3334 |

[3] The external and internal phase is 2:1. The number of organisms must be double that of safflower oil because of the straight chain symmetry and carbon number.

Most of the experimental tests as to the effectiveness of the invention are concerned with vaccines using a bacteria, *Vibrio fetus,* prepared by prior methods and with vaccines prepared by the present method.

In one test, the effects of four different adjuvants combined with a standard dose of *V. fetus* bacterin were compared in breeding female cattle. Each heifer was inoculated with one dose of vaccine. Thirty-four days later, known vibriosis-transmitting bulls were introduced into the cow herd for a 63 day breeding period. The conception rate was later determined by rectal palpation of each female. Results—

Vaccines processed in accordance with old methods:
  (1) Mineral oil+arlacel A adjuvant _____ 7 of 10 pregnant.
  (2) Safflower oil+arlacel A adjuvant _____ 7 of 10 pregnant.
  (3) Aluminum hydroxide adjuvant _____ 2 of 10 pregnant.

Vaccines processed in accordance with the method of the present invention:
  (4) Safflower oil+antigen emulsifier adjuvant _____ 8 of 10 pregnant.

Non-vaccinated controls:
  (5) 0 of 20 pregnant.

These results demonstrate efficacy of safflower oil and indicate the superiority of the present invention. All oil adjuvants are clearly superior to the commonly-used aluminum hydroxide adjuvant. The severity of the challenge of immunity of all 60 animals is amply demonstrated by the failure of all non-vaccinated animals to conceive during the breeding period.

The stimulation of antibody formation in rabbits was also employed to measure the potentiating effect of the present invention, to compare with other adjuvants, and to evaluate various alterations in the present invention. A tube agglutination test using serial two-fold dilutions of rabbit serum was used with *V. fetus* and a serum neutralization test using rabies virus and titered in suckling mice was used for rabies.

Examples of results of one study were:

Positive at—
(1) Mineral oil+arlacel A adjuvant _ 1–800 dilution
(2) Safflower oil+arlacel A adjuvant _____ 1–400 dilution
(3) Safflower oil+antigen emulsifer adjuvant _____ 1–1,600 dilution Results of a following study were:

|     | | Positive at— |
| --- | --- | --- |
| (1) | Mineral oil+arlacel A adjuvant | 1–200 dilution |
| (2) | Safflower oil+antigen emulsifier adjuvant | 1–200 dilution |
| (3) | Animal oil+antigen emulsifier adjuvant | 1–100 dilution |
| (4) | Mineral oil+antigen emulsifier adjuvant | 1–400 dilution |
| (5) | Safflower oil+antigen emulsifier adjuvant using 3 antigens simultaneously in vaccine | 1–100 dilution |
| (6) | Safflower oil+antigen emulsifier, using 3 serotypes of *V. fetus* | 1–100 dilution |
| (7) | Safflower oil+antigen emulsifier, with hydrophilic-lyophilic balance altered for fast absorption | 1–300 dilution |
| (8) | Aluminum hydroxide adjuvant | 1–25 dilution |

What we claim and desire to secure by Letters Patent is:

1. The method of preparing a repository vaccine in the form of oil and water emulsion with an antigen contained in suspension in the emulsion, said method consisting of the steps of
    preparing a gelled oil base,
    reducing to amorphous and discontinuous constituent surface-active parts the cell walls and/or bodies of micro-organisms comprising the antigen component of the vaccine for releasing emulsifier constituents of the treated micro-organisms, and
    mixing together the gelled base, water, and treated organisms to provide an emulsion with the microorganism constituents providing the emulsifier agent for stability of the emulsion.

2. The method of preparing a repository vaccine as described in claim 1, in which the step of preparing the gelled oil base consists of
    mixing oil and aluminum stearate,
    slowly heating the mixture to a temperature in the range of 115° to 130° C. at the rate of 1° per minute,
    and cooling the heated mixture to a temperature of 30° to 40° C.

3. The method of preparing a repository vaccine as described in claim 2, in which the step of preparing the gelled oil base comprises
    adding a sterilant to the oil and aluminum stearate before heating.

4. The method of preparing a repository vaccine as described in claim 1, in which the step of preparing the gelled oil base comprises
    slowly heating the mixture to a temperature in the range of 115° to 130° C. at the rate of 1° per minute,
    slowly cooling the heated mixture to 100° C.,
    and then rapidly cooling the mixture to 30–40° C.

5. The method of preparing a repository vaccine as described in claim 3, and comprising additional steps of
    filling the product into suitable stoppered containers,
    and holding the filled containers for approximately four days for self-sterilization of the product before use.

6. A repository vaccine prepared in accordance with claim 1 in the form of an oil and water emulsion and consisting of an antigenic material consisting of the cell walls and/or bodies of microorganisms reduced to amorphous and discontinuous constituent surface-active parts of the micro-organisms effectively emulsifying or altering the interfacial tension of an oil to a sufficient degree to cause eventual emulsification with aqueous systems, thereby creating the emulsion and holding the emulsion stable when the vaccine is administered.

7. A repository vaccine as described in claim 6, in which the oil is a vegetable oil.

8. A repository vaccine as described in claim 6, in which the oil is an animal oil.

9. A repository vaccine as described in claim 6, in which the oil is a mineral oil.

10. A repository vaccine as described in claim 6, in which the oil is safflower oil.

11. A repository vaccine as described in claim 6, in which the oil is safflower oil and the antigenic material is *Vibrio fetus* bacterin.

12. A repository vaccine as described in claim 6, wherein the oil is safflower oil and the antigenic material is a mixture of serotypes of *Vibrio fetus* bacterin.

13. A repository vaccine as described in claim 6, in which the oil is safflower oil and the antigenic material is a plurality of antigens.

14. A repository vaccine as described in claim 6, and further containing sterilant chemical.

15. A repository vaccine as described in claim 6, in which the oil is safflower oil and the antigenic material is a rabies virus-containing tissue.

References Cited

UNITED STATES PATENTS 2,011,225   8/1935   Krueger _____ 167—78

OTHER REFERENCES

Newhall, J. Am. Vet. Med. Assoc. 149: 1643–1646 (1966), "Results of Field Trials and Controlled Laboratory Studies On Bovine Vibriosis Bacterins."

Firehammer et al. J. Am. Vet. Med. Assoc. 149: 1640–1642 (1966), "Bacterins for Immunization Against Bovine Vibriosis."

LEWIS GOTTS, *Primary Examiner.*

S. K. ROSE, *Assistant Examiner.*

U.S. Cl. X.R.

424—92, 88